US005766662A

United States Patent [19]

Inglett

[11] Patent Number: 5,766,662
[45] Date of Patent: Jun. 16, 1998

[54] DIETARY FIBER GELS FOR CALORIE REDUCED FOODS AND METHOD FOR PREPARING THE SAME

[75] Inventor: George E. Inglett, Peoria, Ill.

[73] Assignee: The United States of America as represented by the Secretary of Agriculture, Washington, D.C.

[21] Appl. No.: 563,834

[22] Filed: Nov. 28, 1995

[51] Int. Cl.⁶ .................................................. A23L 1/05
[52] U.S. Cl. ........................ 426/481; 426/478; 426/479; 426/573; 426/615; 426/804
[58] Field of Search ............................. 426/481, 482, 426/478, 479, 615, 804, 573

[56] References Cited

U.S. PATENT DOCUMENTS

| 2,978,446 | 4/1961 | Battista et al. | 260/212 |
|---|---|---|---|
| 4,619,831 | 10/1986 | Sharma | 426/93 |
| 4,774,098 | 9/1988 | Gould et al. | 426/549 |
| 4,806,475 | 2/1989 | Gould | 435/165 |
| 4,957,599 | 9/1990 | Chou et al. | 162/78 |
| 4,996,063 | 2/1991 | Inglett | 426/21 |
| 5,023,103 | 6/1991 | Ramaswamy | 426/626 |
| 5,057,334 | 10/1991 | Vail | 426/634 |
| 5,068,121 | 11/1991 | Hansen et al. | 426/636 |
| 5,192,569 | 3/1993 | McGinley et al. | 426/96 |
| 5,342,636 | 8/1994 | Bakshi et al. | 426/482 |
| 5,415,804 | 5/1995 | Minami et al. | 252/363.5 |
| 5,518,710 | 5/1996 | Bhatty | 424/195 |
| 5,530,112 | 6/1996 | Greenshields et al. | 536/123.1 |

*Primary Examiner*—Lien Tran
*Attorney, Agent, or Firm*—M. Howard Silverstein; Curtis P. Ribando; John D. Fado

[57] ABSTRACT

Gel substances are prepared from dietary fiber substrates by chemically and physically treating the substrates in a multistage process to substantially complete disintegrate their morphological cellular structures. These gels are characterized by high viscosities and high hydration capacities and can be readily dried and reconstituted. They find utility in a variety of food and non-food compositions, particularly as reduced-calorie fat and/or flour substitutes.

19 Claims, 3 Drawing Sheets

DIETARY FIBER GELS FOR CALORIE REDUCED FOODS AND METHOD FOR PREPARING THE SAME

BACKGROUND OF THE INVENTION

1. Field of the Invention

This invention relates to the conversion of cereal products to dietary fiber gels which are useful in preparing a variety of calorie-reduced foods.

Dietary fibers are generally considered to be the soluble and insoluble components of cell walls that are resistant to endogenous digestion in the human upper digestive tract [Am. J. Clin. Nutr. 25:464–465 (1972)]. Such fibers consist primarily of cellulose, hemicellulose, pectic substances, oligosaccharides, lignin, gums and mucilages.

Dietary fiber has been considered an important food component since early times. Diets containing significant amounts of dietary fiber are known to assist in the digestive process. Burkitt et al. [Lancet 2:1408–1411 (1972)] teach that dietary fiber has a role in the prevention of certain large-intestine diseases, including cancer of the colon and diverticulitis. Burkitt et al. also indicate that serum cholesterol rises when dietary fiber is removed from the diet, and that eating a fiber-rich diet lowers serum cholesterol. Trowell [Am. J. Clin. Nutr. 25:464–465 (1972)] and Dreher [Handbook of Dietary Fiber, An Applied Approach, Marcel Dekker, Inc., New York, NY (1987)] have reported on similar conclusions regarding the relationship between fiber and health benefits.

It is now known that not all dietary fiber is the same and that different fibers provide different health benefits. For example, wheat bran is very rich in insoluble dietary fiber (mainly cellulose and hemicellulose) and is excellent for decreasing the transit time of food through the digestive tract [Anderson et al., Am. J. Clin. Nutr. 32:346–363 (1979)]. Some fibers are reported to reduce total plasma cholesterol [Munoz et al., Am. J. Clin. Nutr. 32:580–592 (1979)].

2. Description of the Prior Art

Insoluble dietary fiber typically consists of morphologically intact cellular tissues of various seed brans, hulls, and other agricultural by-products [Dintzis et al., Cereal Chem. 56:123–127 (1979)]. When added to foods, such fibers impart a gritty texture to the final product. One solution to this problem has been to grind the fibers to give finer powders, but these powders are still intact cellular clusters of tissue. Likewise, the alkaline or alkaline/peroxide treatment of agricultural byproducts as reported by Gould (U.S. Pat. Nos. 4,649,113 and 4,806,475), Gould et al. (U.S. Pat. No. 4,774,098), Ramaswamy (U.S. Pat. No. 5,023,103); and Antrim. (U.S. Pat. No. 4,038,481) essentially leave the morphological structures of the cellular tissue intact and tend to impart a course texture to the end product. Morley et al. (U.S. Pat. No. 4,565,702) and Sharma (U.S. Pat. No. 4,619,831) teach enrobing insoluble dietary fibers with soluble fibers (gums) for providing better texture and mouthfeel. Another form of insoluble dietary fiber is microcrystalline cellulose derived from partially acid-hydrolyzed wood (Battista et al., U.S. Pat. No. 2,978,446). Microcrystalline cellulose consists of poorly dispersible particles requiring suspending agents to obtain suitable products. The insoluble qualities of the microcrystalline cellulose have been improved by coprocessing the cellulose with gums (McGinley et al., U.S. Pat. No. 5,192,569; Tuason et al., U.S. Pat. No. 5,366,742; and Minami et al., U.S. Pat. No. 5,415,804).

As an alternative to insoluble dietary fiber, considerable attention has been given to the soluble fibers. For instance, a water-soluble polysaccharide fraction has been prepared from pectin-like fruit and beet by-products using extrusion to modify the source material (Thibault et al., U.S. Pat. No. 5,275,834). Similarly, there have been a number of reports of alkaline extraction of agricultural materials, including hulls and brans, for obtaining their soluble hemicellulose components (Wolf, U.S. Pat. No. 2,709,699; Rutenberg et al., U.S. Pat. No. 2,801,955; and Gerrish et al., U.S. Pat. No. 3,879,373).

Inglett (U.S. Pat. No. 4,996,063) teaches water-soluble dietary fiber compositions prepared by treatment of milled oat products with a-amylase. In a related development, Inglett (U.S. Pat. No. 5,082,673) teaches a soluble dietary fiber and maltodextrin-containing product prepared by hydrolyzing a cereal flour or a blend of cereal flour and starch with an α-amylase.

In general, dietary fibers heretofore described in the prior art have very low hydration capacities and are incapable of forming viscous suspensions in water.

SUMMARY OF THE INVENTION

I have now discovered a novel class of gels derived from dietary fiber substrates by substantially complete disintegration of their morphological cellular structures. The disintegration is carried out in a multistage process in the presence of alkali. The resultant slurry is cleanly separated into solids and liquids, and the solids are recovered as the gel products of the invention. The gels may optionally be dried to yield rehydratable flakes or powders which can be reconstituted prior to the time of use. They are characterized by a relatively high viscosity at low solids levels and have the ability to retain large amounts of water, thereby yielding very large, smooth, deformable particles.

In accordance with this discovery, it is an object of the invention to extract from dietary fiber substrates gel substances characterized by high viscosities and high hydration capacities.

Another object of the invention is to provide a novel gel carbohydrate material having utility as a reduced-calorie fat and/or flour substitute in a variety of food compositions and having utility in various non-food applications.

A further object of the invention is to enrich the value of dietary fiber substrates by isolating therefrom gel products which can be dried and then rehydrated to give smooth, reconstituted compositions having high viscosities and hydration capacities as well as highly desirable functional properties.

Other objects and advantages of this invention will become readily apparent from the ensuing description.

DETAILED DESCRIPTION OF THE INVENTION

The starting materials for use in the invention include any source of dietary fiber such as seed brans, hulls, and other agricultural by-products. Specific examples of these materials, without limitation thereto, are corn bran, wheat bran, oat hulls, pea hulls, soybean hulls, rice hulls and the like. Prior to the treatment described below, the substrate is normally finely ground to a particle size of less than about 1 mm by any conventional means. It is assumed for purposes of the ensuing discussion that the cellular structure of the source fiber is in its normal intact state. Of course, partially degraded fiber materials could also be employed as the starting material.

The process of the invention is essentially a two-stage treatment which subjects the starting substrate to conditions resulting in substantial disruption of the cellular structures. The specific conditions of treatment required in each of these stages will vary depending on the nature of the starting substrate, other conditions employed in the overall method of preparation, the specific method of drying, and whether any added hydrating substance is incorporated into the final product as discussed further, below. Preferably, both stages are carried out at elevated temperatures. Following at least the second stage of treatment, and preferably following both stages of treatment, the solids are separated from the liquids and the recovered insolubles are carried forward to the next processing step. The first stage separation is designed to remove components which would tend to interfere with the second stage treatment, and the second stage separation is intended to isolate and recover the gel product of the invention.

In the first stage treatment, the ground dietary fiber substrate is slurried with aqueous alkali at concentrations in the range of about 5–25% (pH 9–14), and preferably in the range of about pH 9–13. The preferred alkalis for use herein are sodium and potassium hydroxide. The forces for physically disrupting the cellular structures at this stage can be provided by a variety of means, such as a colloid mill, Waring™ blender, jet cooker, extruder, autoclave or the like, depending on the substrate. In most cases it is preferred that the device applies shear to the fibrous material. A steam jet cooker provides sufficient shear for the treatment of corn bran; whereas for more recalcitrant substrates, such as oat hulls, the cutting action imparted by a colloid mill or Waring™ blender is preferred. The combination of physical conditions and alkali applied to the substrate at this stage of processing should be sufficient to break down the fibers into solids and soluble components. It is desirable to conduct the treatment under conditions of elevated temperatures in the range of about 75°–150° C., and preferably in the range of about 85°–90° C. The requisite period of treatment will, of course, vary with the starting substrate and the other conditions of treatment, but will typically be on the order of about 1–60 minutes. This first stage treatment breaks down the fibers into a slurry of soluble and insoluble components which are both highly colored.

The gel products of the invention are contained in the insoluble fraction resulting from the first stage treatment, and therefore the next step of the process is to separate the solids from the slurry. This first stage separation is optimally carried out by centrifugation or filtration with washing of the solids as necessary. The objective of this step is to rid the solids of as many of the color bodies as possible by resuspending the insolubles in water at about 2–15% solids content and repeating the separation and washing until the wash water runs clear.

The solids obtained from the final washing of the first stage treatment are resuspended in water at about 2–15% solids content and are subjected to the second stage shear treatment. Though the pH of the suspension may be within the range of 7–12, the process is expedited by operating at alkali pHs, preferably in the range of about 8–11. The second stage treatment requires an oxidizing agent such as hydrogen peroxide, or sodium hypochlorite. The purpose of the oxidizing agent is to remove any residual color in the subsequently recovered product and therefore the agent should be incorporated at a level of at least about 1%, and preferably about 5–25%, by weight of the solids in the suspension. It has been observed that the oxidizing agent also serves to increase the rehydratability of the recovered product. At temperatures in the range of about 25°–80° C., preferably in the range of about 40°–70° C., the suspension is subjected to intensive shearing for a period of approximately 20–120 minutes using a jet cooker, colloid mill, Waring™ blender or the like.

Following the second stage treatment, the wet solids are again separated from the liquids in the second stage separation using conventional centrifugation or filtration procedures. The separated solids are resuspended in water, and washed as before until the wash water runs clear and substantially all soluble color bodies are removed and the pH drops to about 6–9. Of course, if desired, the solids can be neutralized with acid, preferably a food grade acid such as hydrochloric or phosphoric. However, excess acidification should be avoided so as to prevent a buildup of salts in the recovered product. At this point, the recovered solids consist of cellular debris in the form of a hydrated gel which is white or very light in color, has little or no flavor, a smooth texture, and a pH in the range of approximately 6–9. The gel may be dried by any conventional means, to include drum drying, spray drying, warm air tray drying, freeze drying, and the like.

The dried products are readily dispersible in water and can be rehydrated to give high viscosity gels. For example, at 3% solids the reconstituted gels are characterized by viscosities of up to 12,000 cps or greater and hydration capacities up to at least about 25, that is they absorb at least approximately 24 times their weight in water as shown in Table 3. Rehydration is efficaciously carried out by subjecting the dried solids to high shear in the presence of water.

The dried material, as with other large biopolymers, will rehydrate more readily in the presence of a hydrophilic substance, particularly a hydrophilic carbohydrate. Hydrophilic proteins or emulsifiers can also be used. It is preferred that the hydrophilic substance is added to the gels before drying in order to achieve the greatest degree of rehydratability. The added hydrophilic substance can also serve to decrease the amount of shear needed during the reconstitution process. Examples of suitable hydrophilic substances include maltodextrins, starches, gums, hemicelluloses, sugars, oat flour hydrolyzates and the like. It is also contemplated that certain soluble carbohydrate components (mainly hemicelluloses) separated from the insolubles in the first separation stage described above can be purified and reintroduced as hydrophilic substances for this purpose.

The gel products of this invention are characterized by several unique and unexpected properties. The drum-dried materials assume a smooth sheet- or film-like morphology. Scanning electron photographs of the dried products of the invention reveal that the fiber particles are completely disrupted and exist as a cellular debris. At magnifications of 500–1000 X, there is visual evidence of curling at loose edges. When in hydrated form, the gels have smooth surfaces with fairly large deformable bodies about 25 to 50 microns in each dimension. The smoothness of the original gels are restored after reconstitution of the dried products. The gels are also characterized by a relatively low level of syneresis after repeated freeze-thaw cycles, though, at a 3% concentration the viscosity will decrease about 50% after each cycle. Since the gels are mostly dietary fiber, their caloric value is nil. Therefore, the smooth textured gels with their high viscosity and hydration capacities make them suitable as ingredients for use in preparing calorie-reduced foods without imparting undesirable cotton-like or dry mouthfeel, or a sandy, chalky, or gritty texture. They can be used as ingredients in meats such as hamburger, in dairy products such as cheeses, yogurt, and ice cream, and in baked goods. In baked goods, replacement of a portion of the fat and/or replacement of a portion of the flour with the gels or powdered gels of the invention actually results in enhancement of the textual qualities of the baked product as demonstrated in Examples 11 and 12, below. The textural qualities imparted by the gels or gel powders can be tailored by appropriate selection of fiber source selection and by coprocessing of fibers from different sources.

The gels of this invention can also impart reduced calorie particulates into fat substitutes, such as the soluble dietary fiber composition described by Inglett in U.S. Pat. No. 4,996,063, herein incorporated by reference. The calorie values of such combinations can be 10 to 90% less than that of the fiber alone. Moreover, the functional properties of the fiber can be improved to be more fat-like and to be more easily hydrated when combined with the products described herein.

Depending on the characteristics of the specific gel or gel powder material and upon the particular end use application, the amount of material added to a composition will typically vary from approximately 1–99%. For example, in a fat substitute formulation, the gel could be the principal ingredient; whereas in a baked goods mix, the addition of the gel powder at a level of approximately 0.25% by weight produces a dramatic enhancement of textural qualities.

The following examples are presented only to further illustrate the invention and are not intended to limit the scope of the invention which is defined by the claims.

It is apparent from the foregoing discussion that the products of this invention may exist in either the hydrated form as gels or in the dehydrated form as flakes or powder. For the sake of clarity where appropriate in the ensuing examples, abbreviations for the treated substrate (e.g. "SCB" for sheared corn bran) will be followed by a "-G" or a "-P" to designated the gel or powder form, respectively.

EXAMPLE 1
Oat hulls: first stage, extrusion; second stage, Waring™ blender.

Ground oat hulls having a 1 mm particle size were blended with powdered sodium hydroxide as shown below in Table 1. In preparation for the first stage treatment, sufficient moisture was added to the blend to give a slurry that would feed into an extruder. Treatment was conducted using a Roundcastle Microtruder™ (Roundcastle Company, Cedar Grove, N.J.) operating at 150 to 200 psi and 88° to 90° C. After extrusion, and without separation of the solubles from the insolubles, the extrudates were sheared (second stage) in a Waring™ blender (Waring Products Div., New Hartford, CO) to give 5<smooth slurries. The pH was measured and adjusted to approximately 7 using Dowex 50W™ cation exchange resin. The insoluble oat hull materials were collected on a 50 mesh sieve (280µ). The combined amounts of particles and solubles that passed through the sieve by difference are listed in Table 1. Particulated oat hull gel was collected by centrifugation.

EXAMPLE 2
Various dietary fibers: first stage, colloid mill; second stage, shaker.

Ground fibers, 100 grams each, from various substrates as shown in Table 2 were blended with 100 mL of 50% sodium hydroxide (sp. gr. 1.52) to give a pH 13, and autoclaved at 15 psi steam for 30 minutes. The semisolid paste was blended with 300 ml water and sheared in a colloid mill [Premier Model Dispersator™, Premier Mill Corporation, Reading, PA., equipped with a Hi-Vis head] for 10 minutes for the first stage treatment. The pH was adjusted to around 7 using Dowex 50W™ (in $H^+$ phase). Sufficient water was added to separate out the solids by sedimentation of the resin and pouring off the liquid. The unconverted insolubles that were less dense than the resin were decanted and collected on a 50 mesh (280µ) sieve and oven dried. The recovered amounts are shown in Table 2. The remaining slurry was passed through a 50 mesh (280µ) sieve to remove the resin. The filtrate was then centrifuged at 18,000 g for 20 min at 25° C. and the gel-containing solids were recovered. For the second stage treatment, the centrifuge solids were mixed with sufficient amount of water to yield a thick slurry (200 to 400 ml), 25 mL of hydrogen peroxide (30%) was added, and the slurry at about pH 7 was shaken vigorously on a shaker at 28° C. for 18 hours. Thereafter, the slurry was centrifuged at 25° C. and 18,000 g for 20 min and the separated solids dried in an oven at 70° C. The yields of the recovered gel dried solids are reported in Table 2.

EXAMPLE 3
Various dietary fibers: first stage, colloid mill; second stage, colloid mill and Waring™ blender.

In a mixing tank, 100 grams of fine ground dietary fibers (listed in Table 3) were mixed with 885 mL of water and heated to 90° C. About 1 gram of 50% sodium hydroxide (sp. gr. 1.52; 11.4% alkali concentration) was added to adjust the pH to about 6.8 before adding 0.24 mL of α-amylase (Taka-Therm L-340™). For the first stage treatment, the mixture was sheared in a colloid mill. After 15 minutes, 15 mL of 50% sodium hydroxide was added and the shearing continued for 45 minutes. The slurry was diluted with one liter water before collecting the solids by centrifugation. The collected solids were repeatedly washed and centrifuged until the pH of the solids was in the range of 8–9. The pH of the solids was then adjusted to 10.5 using 50% sodium hydroxide and the second stage treatment was commenced by shearing the mixture in a colloid mill for 30 minutes in the presence of 75 mL of 30% hydrogen peroxide. The slurry was allowed to stand for 16 hours and shearing was continued in a Waring™ blender for 30 to 60 minutes. Throughout the second stage treatment, the pH of the slurry was maintained in the range of 9 to 11. The slurry was washed with warm water and centrifuged to collect the gel. The gel was reslurried with water and recentrifuged until the gel pH dropped to the range of 6–8. The gel was freeze dried and then reconstituted at 3% solids level by blending with water in a Waring™ blender for 5 min. at 25° C.

Viscosities were measured by a Brookfield viscometer (Brookfield Engineering Laboratories, Stoughton, MA). Hydration capacities of the products was measured by the American Association of Cereal Chemists (AACC Method 56-20, herein incorporated by reference) used for pregelatinized cereal products. Viscosities and hydration capacities of the dried compositions are recorded in Table 3.

EXAMPLE 4

Corn bran: first stage, colloid mill; second stage, colloid mill.

A. In a mixing tank, 1000 g fine ground corn bran was mixed with 11-L of water and heated to 90° C. In preparation for the first stage treatment, about 10 g 50% sodium hydroxide (sp. gr. 1.52; 13.3% alkali concentration) was added to adjust the pH to about 6.8 before adding 2.4 mL of α-amylase (Taka-Therm L-340™) The mixture was sheared in Premier Model 90 Dispersator™ with a Hi-Vis head colloid mill. After 15 minutes, 175 mL of 50% sodium hydroxide was added and the shearing continued for 45 minutes. The slurry was twice diluted with 200-L water before collecting the solids on a 25μ filter bag. The pH of the solids was approximately 7. For the second stage treatment, the pH was adjusted to approximately 10 using 50% sodium hydroxide. 500 mL of 30% hydrogen peroxide was added, and the mixture was sheared in a colloid mill (Premier Model Dispersator™) for 45 min. The slurry was stirred with mild agitation for 36 h and the solids were collected on a 25μ filter bag. For four preparations, viscosities for the undried gels were 12,000, 20,000, 21,200, and 30,000 cps.

B. A corn bran gel prepared as described in Example 4A was characterized by a viscosity of 18,000 cps. When the gel was freeze-dried and reconstituted with vigorous stirring, the viscosity of the resultant gel was 3,800 cps. When drum dried and reconstituted, the viscosity of the resultant gel was 1,700 cps.

C. Codrying gels prepared as in Example 4A on a drum drier in combination with a hydrophilic substance, including hydrolyzed oat flour, unmodified hydrolyzed oat & corn flours or oxidized soluble corn bran fraction (See Example 5) allowed the gels to be reconstituted easily at the 6% solids level with only moderate stirring (Table 4A). Viscosities and hydration capacities reported in Table 4A were determined as described in Example 3.

D. For the examples shown in Table 4B reconstituted at the 5% solids level, a portion (104.60 g) of SCB-G prepared substantially as described in Example 4A was mixed with a rubber spatula with 95 g of starch or flour for 5 min in a lightly greased steel pan. The mixture was oven dried at 50° C. for 2–3 days, bagged, weighed, and the viscosity measured after 5 min of blending in a waring™ blender. The hydration capacity was measured by AACC Method 56–20. For the examples shown in Table 4B reconstituted at the 10 solids level, the above procedure was repeated except with a 209.2 g portion of the SCB-G and with 90 g of starch or flour.

EXAMPLE 5

Preparation of hydrophilic additive from corn bran solubles.

In a mixing tank, 1000 grams of finely ground corn bran was processed similar to Example 3. All centrifugates following both the first and second stage treatments were combined to yield a yellowish liquid containing the solubles from the two treatments. The combined liquids were passed through 6-layers of cheese cloth and ultrafiltrated on a Prostak™ 10K module (Millipore Corporation, Bedford, MA). The 21-L volume of liquid was diluted to 50-L by adding reverse osmosis water. The resulting solution had a pH of 12.4. Diafiltration was continued for 2 hours until the color was substantially removed and the pH reduced to about 9.4. A total of about 500 L of membrane filtrate was discarded. Sixteen liters of concentrated yellow liquid was recovered for further purification by carbon treatment. Dowex 50W (H)™ in a 50 mesh (280μ) sieve was used to adjust the pH to 6–7. The resulting clear liquid was freeze dried to give a white powder of the purified oxidized soluble corn bran fraction which was useful as a hydrophilic additive in Example 4C.

EXAMPLE 6

Corn bran pilot scale: both stages, colloid mill.

In a mixing tank, 180 kg finely ground corn bran was mixed with 1800 kg water and heated to 90° C. About 0.8 kg 50% sodium hydroxide was added to adjust the pH to about 6.8 before adding 0.4 kg α-amylase (Taka-Therm L-340™) After shearing the mixture for 15 minutes in a colloid mill, 106 pounds of 50% sodium hydroxide was added and the first stage shearing continued for 45 minutes. The slurry was diluted with 540 kg of 95° C. water before collecting the solids by centrifugation. The dilution and centrifugation were repeated until the pH of the solids was approximately 8.5. For the second stage treatment, the pH was adjusted to about 10 using 13 kg pounds of 50% sodium hydroxide, and 136 kg of 30% hydrogen peroxide was added followed by shearing the mixture in a colloid mill for 30 minutes. The slurry was stirred with mild agitation for 36 hours and was then centrifuged at about 50° C. to collect a white gel. The gel was reslurried with warm water and recentrifugated until the gel pH dropped to approximately 8. The gel was spray dried and the analysis of the resulting product was 74% total dietary fiber, 12.2% ash, 0.27% protein, 0.30 crude fat, and 8.83% moisture. The dried product was reconstituted with water in a Waring™ blender. The influence of shearing time and water temperatures on 3% solids gel reconstitution of spray dried SCB-G product is shown in Table 5A. The influence of co-drum drying the SCB-G with either TrimChoice™-5 hydrolyzed oat flour or guar gum on rehydration properties is shown in Table 5B.

EXAMPLE 7

Oat hull pilot scale: both stages, colloid mill.

In a mixing tank, 270 kg fine ground oat hulls were mixed with 1460 kg water and heated to 90° C. The pH was about 6.8 before adding 0.44 kg α-amylase (Taka-Therm L-340™). The mixture was stirred for 15 minutes followed by addition of 48 kg 50% sodium hydroxide and sheared in a colloid mill for 60 minutes for the first stage treatment. The resultant slurry was diluted with 3,600 kg water at 95° C. before collecting the solids by centrifugation. The dilution and centrifugation steps were repeated until the pH of the solids was approximately 9. In preparation for the second stage treatment, the pH was adjusted to approximately 10 using 22 kg of 50% sodium hydroxide and 136 kg of 35% hydrogen peroxide before shearing the mixture in a colloid mill for 60 minutes. The slurry was allowed to stand without agitation for 10 hours before shearing again for 30 min. The slurry was centrifuged at about 50° C. to collect a white gel which was reslurried with warm water and recentrifugated until the gel pH dropped to approximately 8. The gel was dried by spray drying, drum drying, or freeze drying as indicated in Tables 6A and 6B, below. The modified oat hulls from spray drying comprised 84.2% total dietary fiber, 6.14% ash, 1.20% protein, 0.26% crude fat, and 8.20% moisture. Various samples of the gel were reconstituted using shear in a Waring™ blender for 5 minutes. The influence of water temperatures on 5% and 10 gel reconstitution is shown in Table 6A. The influence of co-drum drying the SCB-G with TrimChoice™-5 hydrolyzed oat flour and guar gum is shown in Table 6B.

EXAMPLE 8

Freeze-thaw stabilities of Gels.

Dietary fiber gels dried by spray drying or lyophilization were compared to never-dried gels, all at 3% solids by blending in a Waring™ blender for 5 minutes, and the resultant viscosity was measured by means of a Brookfield viscometer. The samples were then frozen to 0° C. and subsequently thawed by placing them in a steel or plastic beaker with running warm water until the temperature was 25° C.±2°. The viscosity measurement was repeated at 24 hr, 48 hr, and 72 hr. The results are reported in Table 7, below.

EXAMPLE 9

Corn bran: first stage, colloid mill; second stage, colloid mill.

In a mixing tank, 1000 g finely ground corn bran was mixed with 11-L of water and heated to 90° C. About 10 g 50% sodium hydroxide (sp. gr. 1.52; 13.3% alkali concentration) was added to adjust the pH to about 6.8 before adding 2.4 mL of Taka-Therm L-340™. The mixture was sheared in a colloid mill. After 15 minutes, 100 mL of 50% sodium hydroxide was added and the shearing continued for 45 minutes. The slurry was diluted to 50-L and the solids collected by centrifugation. The pH was adjusted to 11.8 using 50 mL of 50% sodium hydroxide, 500 mL of 30% hydrogen peroxide was added, and the mixture was sheared in a colloid mill for 60 min. After standing for 72 hours, the slurry was diluted to 40-L and the pH was adjusted to 7.7 using incrementally added Dowex 50W™ (hydrogen phase, 313 grams). The resin was filtered on a 50 mesh sieve (280g). The gel slurry which easily passed through the sieve was centrifuged at 15,000 rpm to collect the gel solids (2513 g). The gel was freeze dried to give a white solid (228.5 g), which was ground to pass a 20 mesh sieve.

EXAMPLE 10
Preparation of Chocolate Candy.

The ground white solid prepared in Example 9 was reconstituted as a gel by blending with water in a Waring™ blender for 30 seconds to give a 5i solids reconstituted product. The 5% corn bran gel (2 oz) was blended with 6 oz of milk chocolate. The mixture was melted by heating in a microwave for 30 seconds, cooled, and cut into pieces. The resultant candy was characterized by a rich chocolate taste and smooth texture without any detectable gritty, cotton-like, or other undesirable textural factor. After one cycle of freezing and thawing, the candy still retained its original excellent sensory properties. These properties were also observed even after being frozen for six months.

EXAMPLE 11
Preparation of Brownies; the effect of SCB-P addition on texture at various levels of flour and fat reduction.

To determine effects of the products of this invention on food texture, a cake-like brownie was prepared with and without sheared corn bran powder (SCB-P) prepared by the method of Example 6. Brownies were prepared with 0% and 50% flour reduction and at 0% and 100% fat reduction according to the following procedure. The "Fat %" in the formulations represents the percentage of fat in the control contributed by all the ingredients; namely the margarine, cocoa, eggs, and flour. However, the "% Fat replaced" refers to the percentage of the margarine which has been eliminated when the indicated amount of SCB-P has been added.

Melted margarine was blended with 6 g vanilla in a Hobart™ mixer for 15 sec. Two 50 g portions of egg were added and mixed for 10 sec. each followed by 30 g cocoa blended for 55 sec. Wheat flour, 0.75 g baking powder, 0.75 g salt and SCB-P (when used) were sifted together five times and added with 100 g sugar to the mixing bowl. After mixing for an additional 40 seconds, 350 g batter was poured into a lightly greased aluminum pan and baked in a preheated oven at 175° C. for 10 min. The ingredient amounts which were varied are reported in Table 8, below.

Sensory analysis of the texture of the brownie products was conducted by a 15-member trained, experienced analytical sensory panel. Products were evaluated for three texture parameters using a 0 to 10 scale as follows:

Moistness (0=dry; 10-moist) Density (0=light; 10=compact) Cohesiveness (0=crumbly; 10=gummy)

Figure 1:
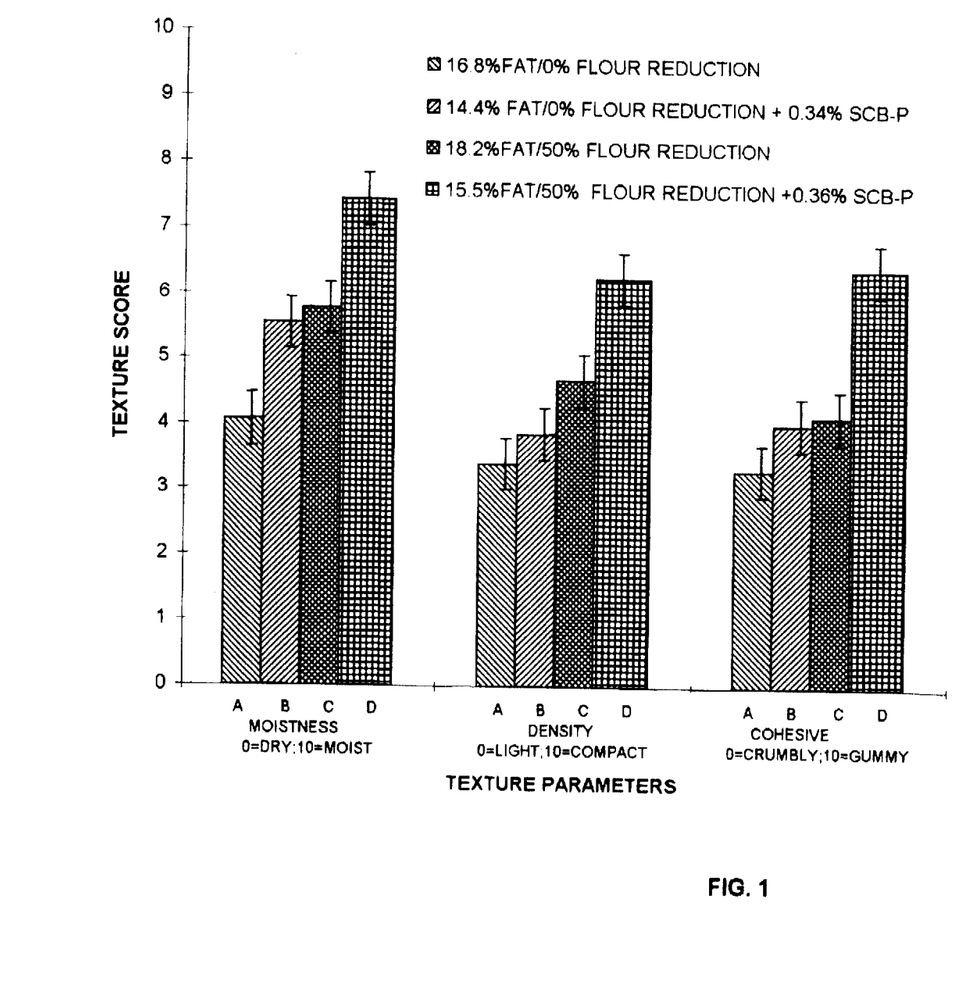
FIG. 1 is a bar graph illustrating the texture scores for brownies in which a portion of the fat and/or flour has been replaced with a sheared corn bran powder made in accordance with the invention and the final fat content is in the weight range of 14.4–18.2% of the total formulation.
Figure 2:
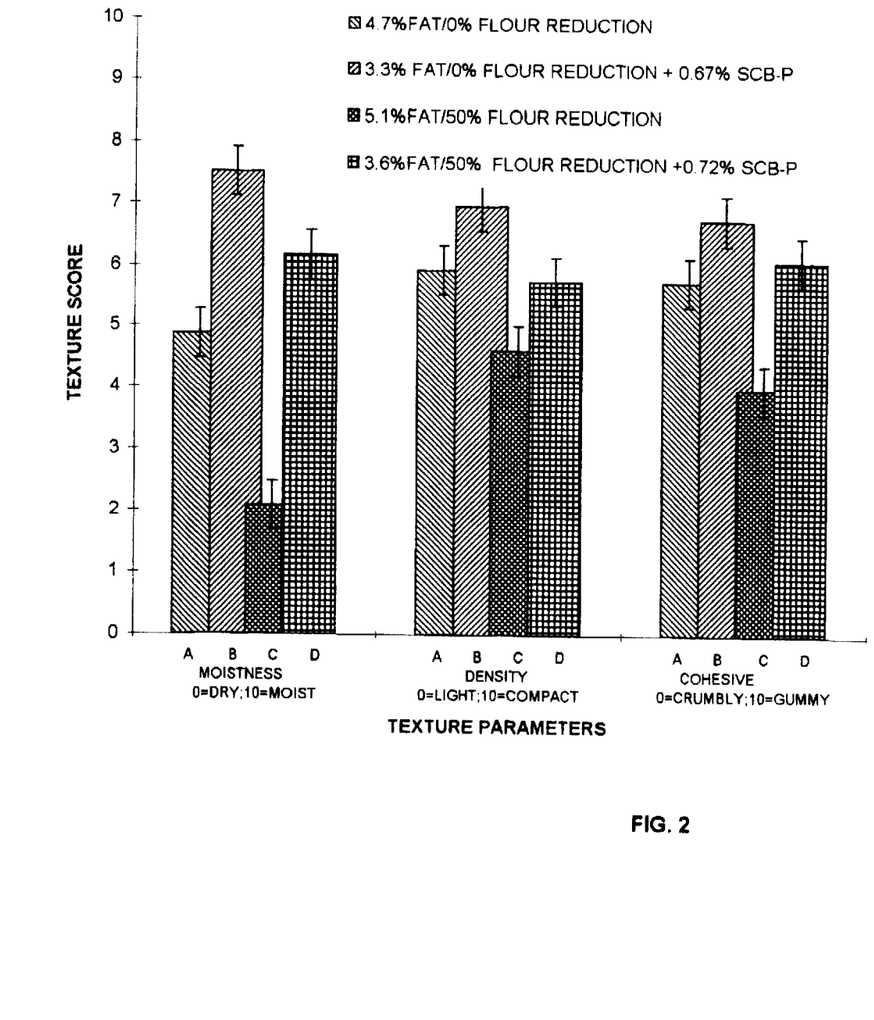
FIG. 2 is a bar graph illustrating the texture scores for brownies in which a portion of the fat and/or flour has been replaced with a sheared corn bran powder made in accordance with the invention and the final fat content is in the weight range of 3.3–5.1% of the total formulation.

The results are shown in FIGS. 1 and 2. Moistness: The addition of SCB-P significantly increased the moistness of the brownies compared to the same product without the material. The rating of 5.0 for moistness for the control (0% fat reduction, 0% flour reduction, not shown) represented a moderately moist product; however, ratings of 7.0 and above represented a fudge-like brownie texture.

Density: The density of the brownies was increased by addition of SCB-P to the formulation. The control (0% fat reduction, 0% flour reduction, not shown) was rated a 4.0 on the density scale indicating a cake-like product. Ratings of 7.0 and above represented a fudge-like brownie texture.

Cohesiveness: The cohesiveness of the texture of the brownies was increased significantly by the addition of SCB-P. Ratings of 7.0 and above represented a fudge-like brownie texture.

EXAMPLE 12

Preparation of Brownies; the effects of SCB-P on brownie texture at 50% flour reduction and fat reductions in the range of 0–100%.

Figure 3:
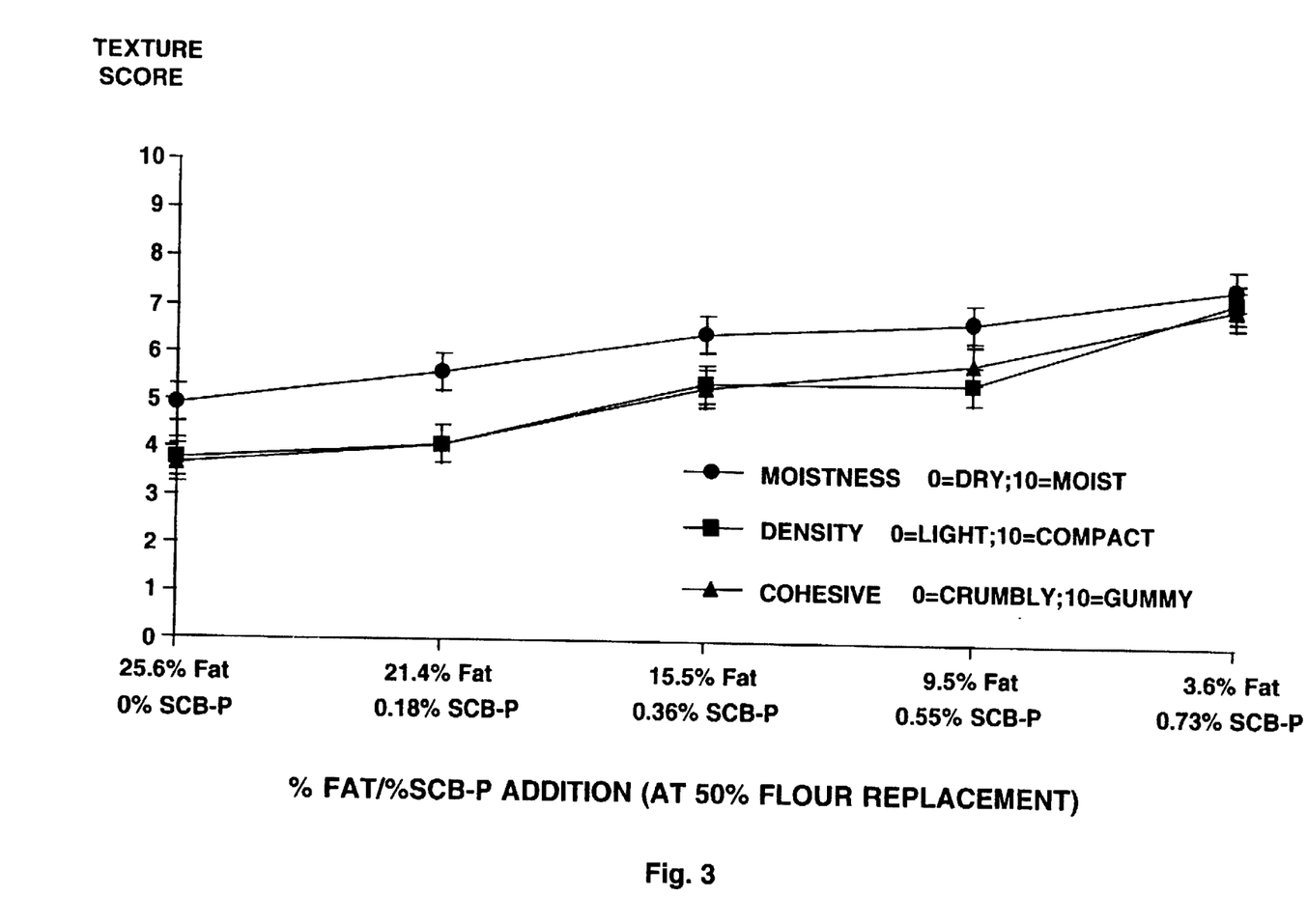
FIG. 3 is a series of line graphs illustrating the effects on texture characteristics of replacing fat in a brownie formulation with a sheared corn bran powder made in accordance with the invention.

The procedure of Example 11 was repeated except the level of flour reduction was held constant at 50% except for the control and the percentage of fat replaced was varied from 0% for the control to 100% as shown in Table 9. The results are given in FIG. 3.

TABLE 1

PARTICULATED OAT HULLS BY EXTRUSION AND SUBSEQUENT VIGOROUS SHEAR

| Sodium Hydroxide (% of solids) | Moisture Added % | Extruded Slurries pH | Particles and Solubles passing 280µ % |
|---|---|---|---|
| 5 | 29 | 10.6 | 0 |
| 10 | 27 | 11.9 | 27 |
| 25 | 30 | 12.3 | 57 |
| 50 | 31 | 12.2 | 65 |

TABLE 2

DIETARY FIBER GELS PRODUCED BY AUTOCLAVING IN STRONG ALKALI AND SUBSEQUENT VIGOROUS SHAKING WITH H₂O₂

| Dietary Fibers | Unconverted Insolubles collected on 280µ screen % | Yield of Dried Gel % |
|---|---|---|
| BARLEY FEED* | 1 | 32 |
| CORN BRAN | 19 | 30 |
| CORN FIBER | 1 | 51 |
| OAT HULLS | 22 | 37 |
| PEA HULLS | 1 | 49 |
| RICE HULLS | 10 | 53 |
| SUGAR BEET | 2 | 26 |
| WHEAT STRAW | 40 | 20 |
| CORN COBS | 20 | 38 |

*Combination of barley components comprising mostly hulls with some barley flour

TABLE 3

GEL RECONSTITUTION (3%) OF FREEZE DRIED COMPOSITIONS

| Dietary Fibers | Viscosity (cps) | Hydration Capacity (x-fold) |
|---|---|---|
| Corn Bran | 5 | 4 |
| Corn Bran Gel | 4200 | 22 |
| Oat Hulls | 3 | 5 |
| Oat Hull Gel | 1270 | 14 |
| Corn Bran*/Oat Hull Gels (1:1) | 4600 | 23 |
| Wheat Bran | 4 | 5 |
| Wheat Bran Gel | 1400 | 18 |

TABLE 4A

EFFECTS OF CODRYING WITH HYDROPHILIC POLYMER ON PROPERTIES OF RECONSTITUTED GEL

| Dietary Fibers | Solids % | Viscosity (cps) | Hydration Capacity (x-fold) |
|---|---|---|---|
| Corn Bran | 3 | 5 | 4 |
| Corn Bran Gel | 3 | 51 | 12 |
| Hydrolyzed Oat & Corn Flours | 3 | 5 | 2 |
| Modified Corn Bran & Hydrolyzed Oat and Corn Flours (1:1) | 6 | 1800 | 20 |
| Hydrolyzed Oat Flour | 3 | 8 | 4 |
| Corn Bran Gel & Hydrolyzed Oat Flour (1:1) | 6 | 7500 | 32 |
| Oxidized Soluble Corn Bran Fraction[1] | 3 | 8 | Soluble |
| Corn Bran Gel & Oxidized Soluble Corn Bran[1] (1:1) | 6 | 4200 | 30 |

[1]See Example 5 for method of preparation

TABLE 4B

VISCOSITIES AND HYDRATION CAPACITIES OF CORN BRAN GE BLENDED WITH STARCH AND FLOURS AND RECONSTITUTED AT 5% OR 10% SOLIDS LEVELS

| Dried Blend | Viscosity Cps | Hydration Capacity (x-fold) |
|---|---|---|
| Ordinary Corn Starch (OCS) | 19 | 0 |
| OCS and Corn bran gel (5%) | 12 | 7.8 |
| OCS and Corn bran gel (10%) | 85 | 10.7 |
| Wheat Starch (WS) | 18 | 0 |
| WS and Corn bran gel (5%) | 24 | 8.4 |
| WS and Corn bran gel (100%) | 88 | 10.1 |
| Wheat Flour (WF) | 80 | 2.2 |
| WF and Corn bran gel (5%) | 102 | 10.2 |
| WF and Corn bran gel (10%) | 113 | 10.5 |
| White Corn Flour (WCF) | 9 | 8.0 |
| WCF and Corn bran gel (5%) | 24 | 8.8 |
| WCF and Corn bran gel (10%) | 85 | 10.0 |

TABLE 5A

INFLUENCE OF SHEARING TIME AND WATER TEMPERATURE ON 3% SOLIDS RECONSTITUTION OF SPRAY DRIED CORN BRAN GEL

| Shear Time min | Temp. °C. | Viscosity (cps) Corn Bran Gel | Viscosity (cps) Corn Bran | Hydration Capacity (x-fold) Corn Bran Gel | Hydration Capacity (x-fold) Corn Bran |
|---|---|---|---|---|---|
| 2.5 | 25 | 9,400 | 4 | 25 | 4 |
| 5.0 | 25 | 11,000 | 17 | 27 | 4 |
| 10.0 | 25 | 12,600 | 14 | 26 | 5 |
| 2.5 | 50 | 9,500 | 10 | 26 | 4 |
| 5.0 | 50 | 7,700 | 15 | 25 | 4 |
| 10.0 | 50 | 10,700 | 21 | 24 | 4 |
| 2.5 | 75 | 10,500 | 14 | 23 | 4 |
| 5.0 | 75 | 8,700 | 12 | 24 | 4 |
| 10.0 | 75 | 7,500 | 10 | 25 | 4 |

TABLE 5B

INFLUENCE OF CO-DRYING[a] SHEARED CORN BRAN GEL WITH HYDROPHILIC CARBOHYDRATE ON REHYDRATING PROPERTIES FOR 3% SOLIDS RECONSTITUTION

| | Viscosity (cps) | | | | Hydration Capacity (x-fold) | |
|---|---|---|---|---|---|---|
| Shearing: | Vigorous[b] | | Mild[c] | | | |
| Co-Drying Method: | Drum | Oven | Drum | Oven | Drum | Oven |
| Corn Bran Gel | 6,200 | 7,300 | 1,100 | 55 | 23 | 19 |
| Corn Bran Gel & TrimChoice ™-5 | 8,500 | 15,500 | 3,000 | 100 | 28 | 21 |
| Corn Bran Gel & Guar Gum | 7,200 | 8,800 | 2,500 | 40 | 27 | 12 |

[a]Co-drying by either drum drying with 40 psi steam or by forced air oven at 65° C.
[b]Waring ™ blendor for 5 minutes.
[c]Premier Mill ™ duplex head for 5 minutes.

TABLE 6A

INFLUENCE OF WATER TEMPERATURE ON 5 and 10% GEL RECONSTITUTION OF SPRAY DRIED SHEARED OAT HULL GEL COMPARED WITH COMMERCIAL OAT FIBER[a] AND OAT HULLS

| Gel Conc. % | Temp. °C. | Viscosity Cps Oat Hull Gel | Viscosity Cps Oat Fiber | Viscosity Cps Oat Hulls | Hydration Capacity (x-fold) Oat Hull Gel | Hydration Capacity (x-fold) Oat Fiber | Hydration Capacity (x-fold) Oat Hulls |
|---|---|---|---|---|---|---|---|
| 5 | 25 | 630 | 30 | 22 | 10 | 5 | 3 |
| 5 | 50 | 1,000 | 15 | — | 10 | 5 | — |
| 5 | 75 | 1,100 | 25 | — | 9 | 5 | — |
| 10 | 25 | 11,100 | 240 | 84 | 8 | 5 | 4 |
| 10 | 50 | 15,700 | 400 | — | 8 | 5 | — |
| 10 | 75 | 7,000 | 225 | — | 8 | 5 | — |

[a]Oat fiber prepared by Canadian Harvest by U.S. PAT. NO. 4,649,113.

TABLE 6B

INFLUENCE OF CODRYING SHEARED OAT HULL GEL WITH HYDROPHILIC CARBOHYDRATE ON REHYDRATION PROPERTIES AT 5% SOLIDS RECONSTITUTION

| Drying Method: | Viscosity (cps) | | Hydration Capacity (x-fold) | |
|---|---|---|---|---|
| | Freeze | Drum | Freeze | Drum |
| Oat Hull Gel | 380 | 950 | 7 | 8 |
| Oat Hull Gel & TrimChoice ™-5 | 3500 | 2000 | 10 | 11 |
| Oat Hull Gel & Guar Gum | 725 | 300 | 8 | 6 |

TABLE 7

DIETARY FIBER GELS (3% SOLIDS) FREEZE-THAW STABILITIES

| Composition and Number | Drying Procedure | Viscosity, cps | | | |
|---|---|---|---|---|---|
| | | Original | 24 hr | 48 hr | 72 hr |
| Corn Bran Gel | Not Dried | 18,000 | 12,400 | 15,000 | 9,400 |
| Corn Bran Gel | Spray Dried | 9,650 | 2,200 | 1,300 | 1,100 |
| Corn Bran Gel | Lyophilized | 8,900 | 8,000 | 1,500 | 1,400 |
| Wheat Bran Gel | Lyophilized | 6,700 | 550 | 250 | 150 |
| Oat Hull Gel | Lyophilized | 1,275 | 130 | 160 | 124 |

TABLE 8

BROWNIE COMPOSITIONS AND FORMULATIONS: FLOUR AND FAT VARIED

| | COMPOSITIONS | | FORMULATIONS | | | | | | |
|---|---|---|---|---|---|---|---|---|---|
| EXAMPLE | % Flour replaced | % Fat replaced[a] | SCB-P g | SCB-P % | Water g | Flour g | Margarine g | Fat % | Calories/g[b] |
| Control | 0% | 0% | 0 | 0 | 0 | 58 | 113.5 | 25.6 | 3.4 |
| 11A | 0% | 50% | 0 | 0 | 0 | 58 | 56.8 | 16.8 | 2.9 |
| 11B | 0% | 50% | 1.4 | 0.34 | 55.1 | 58 | 56.8 | 14.4 | 2.6 |
| 11C | 50% | 50% | 0 | 0 | 0 | 29 | 56.8 | 18.2 | 2.9 |
| 11D | 50% | 50% | 1.4 | 0.36 | 55.1 | 29 | 56.8 | 15.5 | 2.5 |
| 11E | 0% | 100% | 0 | 0 | 0 | 58 | 0 | 4.7 | 2.2 |
| 11F | 0% | 100% | 2.8 | 0.67 | 110 | 58 | 0 | 3.3 | 1.7 |
| 11G | 50% | 100% | 0 | 0 | 0 | 29 | 0 | 5.1 | 2.1 |
| 11H | 50% | 100% | 2.8 | 0.72 | 110 | 29 | 0 | 3.6 | 1.6 |

[a]Percentage of margarine reduced.
[b]Calculated values

TABLE 9

BROWNIE COMPOSITIONS AND FORMULATIONS: FAT VARIED AT 50% FLOUR REPLACEMENT

| | COMPOSITIONS | | FORMULATIONS | | | | | | |
|---|---|---|---|---|---|---|---|---|---|
| EXAMPLE | % Flour replaced | % Fat replaced[a] | SCB-P g | SCB-P % | Water g | Flour g | Margarine g | Fat % | Calories/g[b] |
| Control | 0% | 0% | 0 | 0 | 0 | 58 | 113.5 | 25.6 | 3.4 |
| 12A | 50% | 25% | 0.7 | 0.18 | 28.4 | 29 | 84 | 21.4 | 3.0 |
| 12B | 50% | 50% | 1.4 | 0.36 | 55.1 | 29 | 56.8 | 15.5 | 2.5 |
| 12C | 50% | 75% | 2.1 | 0.55 | 85.1 | 29 | 28.4 | 9.5 | 2.0 |
| 12D | 50% | 100% | 2.8 | 0.73 | 110 | 29 | 0 | 3.6 | 1.6 |

[a]Percentage of margarine reduced.
[b]Caluclated values.

I claim:

1. A noncaloric, gellable product consisting essentially of cellulosic, physically disrupted cellular debris characterized by the property of yielding a viscosity of at least about 300 cps and a hydration capacity of at least about 10 times its weight when reconstituted with water at 3% solids.

2. The product of claim 1, wherein the source of said cellulosic, cellular debris is an agricultural byproduct.

3. The product of claim 2, wherein said agricultural byproduct is selected from the group consisting of corn bran, oat hulls, soybean hulls and pea hulls.

4. A gellable composition comprising (1) a noncaloric, gellable product consisting essentially of cellulosic, physically disrupted cellular debris characterized by the property of yielding a viscosity of at least about 300 cps and a hydration capacity of at least about 10 times its weight when reconstituted with water at 3% solids and (2) a hydrophilic substance.

5. The composition of claim 4 wherein said hydrophilic substance is selected from the group consisting of maltodextrins, starches, gums, hemicelluloses, sugars, and oat flour hydrolyzates.

6. The composition of claim 4 and further comprising a food substance other than said hydrophilic substance.

7. A method of converting a dietary fiber-containing substrate into a noncaloric gel consisting essentially of cellulosic, physically disrupted cellular debris comprising the steps:

a. treating the substrate in the presence of an amount of alkali and under physical conditions sufficient to produce a first slurry comprising both soluble and insoluble degradation products of said dietary fiber;

b. separating the insoluble degradation products from said first slurry;

c. treating the separated insoluble products in a second slurry in the presence of alkali and an oxidizing agent selected from the group consisting of hydrogen peroxide and sodium hypochlorite under conditions of shear sufficient to substantially completely disintegrate the morphological cellular structures of said substrate and to produce a hydrated gel;

d. recovering said gel by separating it from the second slurry.

8. The method of claim 7 wherein said gel is further recovered by drying.

9. The method of claim 8 wherein a hydrophilic substance is added to the gel prior to drying.

10. The method of claim 9 wherein said hydrophilic substance is selected from the group consisting of maltodextrins, starches, gums, hemicelluloses, sugars, and oat flour hydrolyzates.

11. The method of claim 7 wherein said dietary fiber-containing substrate is selected from the group consisting of corn bran, oat hulls, soybean hulls and pea hulls.

12. The method of claim 11 wherein said dietary fiber-containing substate is corn bran.

13. The method of claim 11 wherein said dietary fiber-containing substate is oat hulls.

14. The method of claim 7 wherein said alkali in steps (a) and (c) is sodium hydroxide and said oxidizing agent in step (c) is hydrogen peroxide.

15. A product produced by the method of claim 7.
16. A product produced by the method of claim 8.
17. A product produced by the method of claim 9.
18. A product produced by the method of claim 11.
19. A food composition normally comprising fat and/or flour, wherein at least a portion of said fat and/or flour has been replaced with the product of claim 1.

* * * * *